Oct. 16, 1956  C. M. O'LEARY  2,766,589
HYDROKINETIC TORQUE CONVERTER FLUID PRESSURE CONTROL SYSTEM
Filed Nov. 30, 1953
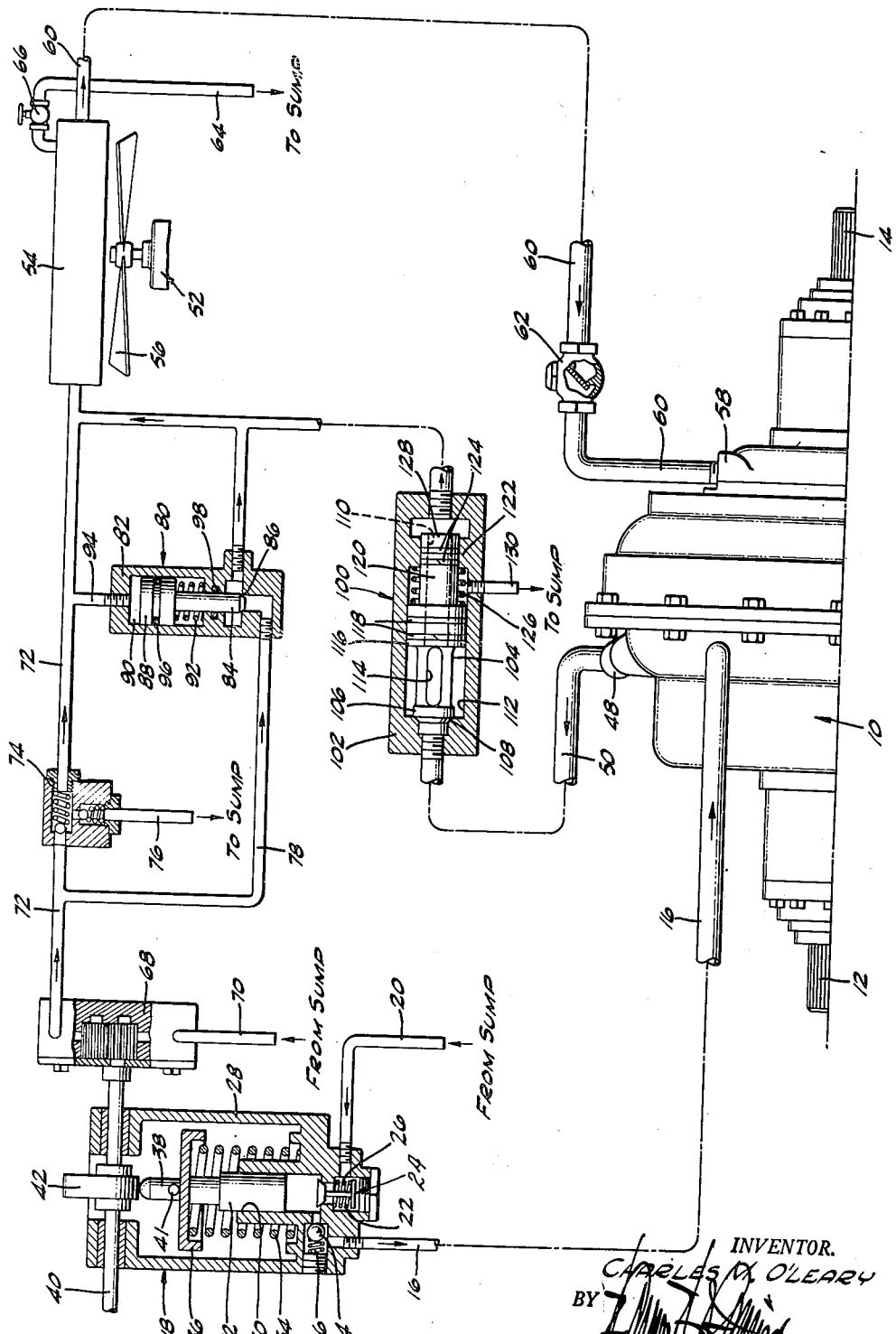
INVENTOR.
CHARLES M. O'LEARY
BY
ATTORNEY

United States Patent Office 2,766,589
Patented Oct. 16, 1956

2,766,589

HYDROKINETIC TORQUE CONVERTER FLUID PRESSURE CONTROL SYSTEM

Charles M. O'Leary, Los Angeles, Calif.

Application November 30, 1953, Serial No. 395,124

3 Claims. (Cl. 60—54)

This application is a continuation-in-part of my co-pending application Serial No. 277,457, filed March 19, 1952, for "Torque Converter Fluid Control System," now U. S. Patent 2,723,530 of Nov. 15, 1955.

My present invention relates to hydrokinetic torque converters to be used for power transmissions, and it relates particularly to a unique system for controlling the fluid pressure in the torque converted torus and in the fluid circulatory system external to the torus.

It is well known in the art to provide hydrokinetic torque converters within which the operating fluid pressure and rate of fluid flow is determined by the speed of the engine associated with the torque converter input shaft, the operating fluid pressure and rate of flow being at a minimum when the engine is idling, and increasing as the engine speed is increased. This dependence upon engine speed for adequate torque converter operating fluid pressure in prior art hydrokinetic torque converters caused cavitation in the converter torus at relatively low operating speeds, and caused aeration of the torque converter operating fluid. Thus, it was impossible in prior art hydrokinetic torque converters to obtain the maximum starting torque theoretically obtainable, and large efficiency losses occurred in these prior art hydrokinetic torque converters.

It is therefore an object of my present invention to provide means for effecting a positive pressure in the torus of a hydrokinetic torque converter at low and idling engine speeds in order to prevent cavitation and aeration of the converter operating fluid and to maintain the fluid at its maximum density, in order to increase the starting torque available at the converter output shaft and to increase the converter efficiency.

Another object of my present invention is to provide a positive displacement pump associated with the torus of a hydrokinetic torque converter to provide a positive pressure in the torus of the converter at all engine speeds.

Another object of my present invention is to provide a torque converter fluid control system which includes a positive displacement pump associated with the torus of a converter, and a secondary pump associated with the portion of the converter fluid circulatory system which is external to the torus of the converter.

Another object of my present invention is to provide means for maintaining the operating fluid in a hydrokinetic torque converter at substantially its maximum density for all operating conditions of the converter.

Other objects and advantages of my present invention will be apparent from the following description and claims, the novelty of my invention consisting in the features of construction, the combinations of parts, the novel relations of the members and the relative proportioning, disposition and operation thereof, all as is more completely described herein and as is more particularly pointed out in the appended claims.

The accompanying drawing, forming a part of the present specification, is an elevational view, partly in section, of my present invention.

Referring to my drawing, I provide a hydrokinetic torque converter 10 having the usual input and output shafts 12 and 14, respectively.

Operatively connected to the torus of the converter by means of a fluid pressure line 16 is a positive displacement pump 18. Positive displacement pump 18 is provided with converter operating fluid from the converter sump (not shown) through an intake line 20 which is operatively connected to an intake valve chamber 22. The pump intake valve 24 is normally urged into its closed position as is illustrated in the drawing by means of a valve spring 26.

Mounted within housing 28 of positive displacement pump 18 is pump cylinder 30 within which is reciprocably mounted pump piston 32. Piston 32 is normally urged toward its uppermost position by means of a compression spring 34 which abuts against pump spring retainer 36 that is affixed to a piston extension 38 by means of pin 40.

Reciprocation of piston 32 in cylinder 30 is effected by rotation of a drive shaft 40 passing through the upper portion of pump housing 28 and carrying an integral cam 42 which is in operative engagement with the upper end of piston extension 38.

Operatively connected to the lower portion of pump cylinder 30 adjacent to intake valve 24 is pump discharge valve 44 which is normally urged into its closed position by means of discharge valve spring 46. Fluid discharged through discharge valve 44 passes through fluid pressure line 16 into the torus of converter 10.

Drive shaft 40 is preferably driven from the input shaft 12 of converter 10, but may alternatively be driven by the engine (not shown) which is to be connected to input shaft 12, or by any other independent source of rotary power.

During the upstroke of piston 32, valve 24 is opened and converter operating fluid is drawn through intake line 20 and intake valve 24 into pump cylinder 30. During the downstroke of piston 32, this fluid in pump cylinder 30 is forced out through pump discharge valve 44 into fluid pressure line 16, intake valve 24 being seated during this operation.

Referring now particularly to the operating fluid circulatory system of the converter which is external to the torus of the converter, converter 10 is provided with a fluid discharge port 48 connecting with the torus of the converter at a point where fluid is discharged from the pump element of the converter. Operating fluid discharged through fluid discharge port 48 passes through fluid discharge line 50 to a converter operating fluid cooling mechanism 52 which normally includes a cooling radiator 54 and an associated fan 56, the drive mechanism of which is not shown. Suitable mechanism for driving fan 56 is shown and described in detail in my co-pending application Serial No. 240,178 for "Hydrokinetic Torque Transmitters," now U. S. Patent 2,714,804 of Aug. 9, 1955.

The cooled converter operating fluid which is passed through radiator 54 is then returned to the torus of the converter through the converter low-pressure intake port 58 by means of fluid return conduit 60. Conduit 60 is provided with a check valve 62 opening toward the converter to prevent fluid from leaving the torus of the converter by way of line 60.

A radiator bleeder line 64 connects the top of radiator 54 to the converter sump (not shown), and bleeder line 64 is provided with a suitable control valve 66 which permits adjustment of the amount of bleed-off through bleeder line 64. The purpose of bleeder line 64 is to bleed off any converter operating fluid containing air so that this air will be permitted to settle out of the oil in the sump (not shown) and the oil may then be re-used in the converter as solid oil.

I provide a second fluid pump 68 which is also preferably driven by means of drive shaft 40, but which may be driven by any other suitable connection to input shaft 12 of converter 10 or to any independent source of rotary power. Fluid pump 68 is not the type of positive displacement pump as is pump 18, but is preferably a geared, rotary fluid pressure pump which pumps fluid at a volume and pressure that is a function of the converter input shaft speed, the pressure and volume developed by pump 68 increasing as the speed of input shaft 12 increases.

Converter operating fluid is provided to pump 68 through pump intake line 70, and fluid is pumped into the portion of the torque converter circulatory system that is external to the torus of converter 10 through pump discharge line 72 which connects with fluid line 50.

The fluid pressure in the fluid circulatory system which is external to the torus of the converter is regulated by means of a fluid pressure regulator 74 which is of the ball type and is spring-loaded, and which may be adjusted as required. Fluid discharge from pressure regulator 74 is returned to the sump (not shown) through a fluid line 76. Other types of commercial pressure regulators may be used to control the pressure in line 72 without departing from my invention. With the use of such other types of regulators the hereinafter described by-pass line 78 and by-pass valve 80 may be omitted from the system.

In order to permit the rapid build-up of fluid pressure in my converter fluid circulatory system when it is first started, and in order to provide a maximum of fluid pressure in the system when the engine speed is low, I provide a by-pass line 78 which by-passes pressure regulator 74. I have shown by-pass line 78 as connecting pump discharge line 72 between fluid pump 68 and pressure regulator 74 to fluid discharge line 50.

Interposed in by-pass line 78 is a normally open by-pass valve 80. Slideably mounted within the housing 82 of by-pass valve 80 is a valve stem 84 which is adapted to seat against valve seat 86. A valve piston 88 is integrally attached to the upper end of valve stem 84, and is slideably mounted within valve cylinder 90. A compression spring 92 disposed between piston 88 and the bottom of valve cylinder 90 normally urges piston 88 and valve stem 84 to their uppermost position, so that by-pass valve 80 is normally open.

Fluid pressure for actuation of valve 80 is provided at the upper end of cylinder 90 by means of a branch line 94 leading from pump discharge line 72 to the top of cylinder 90. Leakage of the fluid applied through branch line 94 through valve 90 is prevented by suitable sealing rings 96 and 98 disposed about piston 88 and valve stem 84, respectively.

At low engine speeds, before fluid pump 68 provides a sufficient volume of fluid and sufficient fluid pressure, the fluid will pass through by-pass line 78 from pump 68 into the converter circulatory system. However, as soon as the fluid pressure from pump 68 is sufficient to cause piston 88 in by-pass valve 80 to move downwardly to the closed position illustrated in the drawing, by-pass line 78 is closed off and the fluid pressure in the system is then regulated by pressure regulator 74. Thus, by-pass line 78 and by-pass valve 80 permit the pressure in my external converter fluid circulatory system to be raised to normal operating pressure much faster than if this mechanism were not provided.

I provide a pressure operated valve 100 in fluid discharge line 50. Slideably mounted within housing 102 of pressure operated valve 100 is valve element 104 having a solid end 106 which is normally seated in valve seat 108 to shut off the flow of fluid from converter fluid discharge port 48 into pressure operated valve 100.

The main body of valve element 104 is provided with a longitudinal central passage 110 which opens into the main valve cylinder 112 through valve element ports 114. A piston portion 116 of valve element 104 is slideably mounted in main valve cylinder 112 in sealing engagement therewith, suitable sealing rings 118 being provided. An extension 120 of valve element 104 having a diameter considerably less than piston portion 116 is slideably mounted in sealing engagement with a reduced bore 122, suitable sealing rings 124 being provided on valve element extension 120. A valve spring 126 disposed in compression between valve element piston portion 116 and one end of reduced bore 122 urges valve element 104 into its normally closed position as illustrated in the drawing.

Pressure operated valve 100 will remain closed until the total force exerted by the fluid from converter fluid discharge port 48 on the left-hand side of valve element 104 is sufficient to overcome the force of compression spring 126.

Spring 126 is provided with the correct strength to maintain valve 100 in its closed position as shown in the drawing until the operating fluid pressure within the torus of converter 10 reaches the desired normal operating fluid pressure. Thereafter, pressure operated valve 100 will operate as a poppet valve to maintain the normal operating fluid pressure within the torus of converter 10. Positive displacement pump 18 is capable of producing a fluid pressure within the torus of converter 10 which is substantially greater than the desired operating pressure.

Any operating fluid which seeps past sealing rings 118 and 124 of valve element 104 into the portion of valve cylinder 112 containing spring 126 will be returned to the sump (not shown) through a fluid conduit 130.

Having described the structural details of my invention in full, I will now describe the preferred operation of my invention.

As soon as converter operation is commenced by rotating converter input shaft 12 at idling and low engine speeds, drive shaft 40 commences rotating to cause actuation of positive displacement pump 18. At this time, pressure operated valve 100 is in its closed position as shown in the drawing and valve 62 is also closed, so that the operating fluid pressure within the torus of converter 10 is immediately raised to the normal operating pressure, this normal operating pressure being maintained within the torus of converter 10 at all times during the operation of converter 10.

By thus immediately bringing the fluid pressure up to normal operating pressure within the torus of converter 10 upon actuation of converter 10, aeration of the operating fluid within the converter and cavitation within the converter are eliminated. Thus, the converter operating fluid at all times has its maximum fluid density, so that the maximum starting and running torque and the maximum operating efficiency and horsepower output are at all times obtained from the converter.

At low and idling engine speeds positive displacement pump 18 maintains the fluid pressure within the torus of converter 10 at the normal operating pressure, and only a small amount of fluid passes through pressure operated valve 100 which is then operating as a poppet valve. At this time, pump 68 will supply a relatively low fluid pressure in line 72, whereby by-pass valve 80 is opened to by-pass fluid in line 78 around pressure regulator 74. This fluid from pump 68 keeps radiator 54, fluid line 50 and line 60 down to valve 62 filled with fluid. At this time, the fluid which passes through radiator 54 is turned to the sump (not shown) through radiator bleeder line 64.

This relatively low pressure in the radiator system and the relatively slow flow of fluid therethrough at relatively low engine speeds is sufficient to dissipate the relatively small amount of excess heat generated by the converter at these speeds.

As the engine speed increases, the amount of fluid which passes into the radiator 54 from fluid pump 68 correspondingly increases until the pressure within the radiator system, and particularly in line 72, is sufficient to close by-pass valve 80 so that the pressure in lines 72, 50 and in radiator 54 is governed by pressure regulator 74.

Pressure regulator 74 is normally adjusted to maintain a slightly higher pressure within the radiator system than is required in the torus of the converter to open pressure operated valve 100. Thus, when the pressure in line 72 and in line 50 above valve 100 is caused by pump 68 to be raised to the normal operating pressure, the fluid pressure on both sides of valve 100 will be substantially the same and there will be a total force differential between the small area of the end 128 of valve element extension 120 and the larger area at the left-hand side of piston portion 116 of valve element 104, and this force differential will be sufficient to overcome the compression of spring 126 in order to keep valve 100 in the open position during normal operation of converter 10.

Thereafter, the pressure in lines 50, 72, 60 and in radiator 54 will remain substantially constant regardless of how high the engine speed becomes, but the fluid volume which passes through radiator 54 will continue to increase as the engine speed increases, because of the increased volume of fluid which is provided by pump 68, and also because of the increased volume of fluid which now passes unrestricted through pressure operated valve 100 from the torus of converter 10. This increasing rate of flow of fluid through radiator 54 as the engine speed increases permits radiator 54 to satisfactorily dissipate the correspondingly larger amounts of heat produced in the converter.

It is to be understood that the form of my invention herein shown and described is my preferred embodiment and that various changes in the shape, size and arrangement of parts may be resorted to without departing from the spirit of my invention, or the scope of my appended claims.

I claim:

1. A hydrokinetic torque converter fluid pressure control system including a hydrokinetic torque converter torus having outlet and inlet ports, a converter operating fluid cooling system operatively connected in a fluid flow circuit between said outlet and inlet ports to receive converter operating fluid from said outlet port and to return cooled operating fluid to said inlet port, a fluid pressure control valve between said outlet port and said cooling system, a check valve between said cooling system and said inlet port, a plurality of sources of fluid under pressure, a fluid connection between one of said sources of fluid under pressure and said torus, and a fluid connection between a second of said sources of fluid under pressure and the fluid flow circuit between said pressure control valve and said cooling system, said pressure control valve being operable to open at a predetermined fluid pressure in said cooling system and to close when the fluid pressure in said cooling system drops below a predetermined value.

2. A hydrokinetic torque converter fluid pressure control system including a hydrokinetic torque converter torus having outlet and inlet ports, a converter operating fluid cooling system operatively connected in a fluid flow circuit between said outlet and inlet ports to receive converter operating fluid from said outlet port and to return cooled operating fluid to said inlet port, a fluid pressure control valve between said outlet port and said cooling system, a check valve between said cooling system and said inlet port, a plurality of sources of fluid under pressure, a fluid connection between one of said sources of fluid under pressure and said torus, a fluid connection between a second of said sources of fluid under pressure and the fluid flow circuit between said pressure control valve and said cooling system, said pressure control valve being operable to open at a predetermined fluid pressure in said cooling system and to close when the fluid pressure in said cooling system drops below said predetermined value, and a pressure regulator in said fluid connection from said second source of fluid under pressure to said cooling system for maintaining the desired fluid pressure in said cooling system.

3. A hydrokinetic torque converter fluid pressure control system including a hydrokinetic torque converter torus having outlet and inlet ports, a converter operating fluid cooling system operatively connected in a fluid flow circuit between said outlet and inlet ports to receive converter operating fluid from said outlet port and to return cooled operating fluid to said inlet port, a fluid pressure control valve between said outlet port and said cooling system, a check valve between said cooling system and said inlet port, a positive displacement fluid pressure pump operatively connected to said torus, a second fluid pressure pump, the volume and pressure output of which increase with increases in converter input shaft speed, operatively connected to the fluid flow circuit between said pressure control valve and said cooling system, said pressure control valve being operable to open at a predetermined fluid pressure in said cooling system and to close when the fluid pressure in said cooling system drops below said predetermined value.

References Cited in the file of this patent

UNITED STATES PATENTS

| | | |
|---|---|---|
| 2,638,746 | Kelley | May 19, 1953 |
| 2,643,517 | Michell | June 30, 1953 |